United States Patent
Tomeba et al.

(10) Patent No.: US 8,976,881 B2
(45) Date of Patent: Mar. 10, 2015

(54) WIRELESS RECEIVING APPARATUS AND PROGRAM

(75) Inventors: Hiromichi Tomeba, Osaka (JP); Takashi Onodera, Osaka (JP); Hiroshi Nakano, Osaka (JP); Alvaro Ruiz Delgado, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/235,537

(22) PCT Filed: Jul. 19, 2012

(86) PCT No.: PCT/JP2012/068363
§ 371 (c)(1),
(2), (4) Date: Jan. 28, 2014

(87) PCT Pub. No.: WO2013/018555
PCT Pub. Date: Feb. 7, 2013

(65) Prior Publication Data
US 2014/0177763 A1    Jun. 26, 2014

(30) Foreign Application Priority Data
Jul. 29, 2011  (JP) ................. 2011-167582

(51) Int. Cl.
*H04L 27/28*    (2006.01)
*H04B 7/04*    (2006.01)
(Continued)

(52) U.S. Cl.
CPC .......... *H04B 7/0478* (2013.01); *H04L 25/0212* (2013.01); *H04L 25/0224* (2013.01);
(Continued)

(58) Field of Classification Search
CPC ........... H04L 27/2668; H04L 27/2675; H04L 27/2695; H04L 27/2697

USPC .................................. 375/260, 316
See application file for complete search history.

(56) References Cited

U.S. PATENT DOCUMENTS 8,483,106 B2 *  7/2013  Hwang et al. ................. 370/279
8,737,499 B2 *  5/2014  Sikri et al. .................... 375/260
(Continued)

OTHER PUBLICATIONS

Hochwald et al., "A Vector-Perturbation Technique for Near-Capacity Multiantenna Multiuser Communication-Part II: Perturbation", IEEE Transaction on Communication, vol. 53, No. 3, Mar. 2005, pp. 537-544.
Joham et al., "MMSE Approaches to Multiuser Spatio-Temporal Tomlinson-Harashima Precoding", Proceedings of the 5th International ITG Conference on Source and Channel Coding, Erlangen, Germany, Jan. 2004, 8 pages.
(Continued)

*Primary Examiner* — Kevin Kim
(74) *Attorney, Agent, or Firm* — Keating & Bennett, LLP

(57) ABSTRACT

A data signal component output from a reference signal demultiplexer and channel state information obtained by using DM-RS output from a channel estimating unit are input into a modulo estimating unit. In a channel compensator, a first provisional decision value sequence is calculated on the basis of the channel state information. The first provisional decision value sequence is input into a modulo calculator, and modulo calculations are performed on the first provisional decision value sequence to obtain a second provisional decision value sequence. A decision-feedback channel estimating section finds a first channel estimation value based on the first provisional decision value sequence and a second channel estimation value based on the second provisional decision value sequence. A modulo decision section decides whether or not a perturbation term has been added to a code, and uses a decision result for the selection of a demodulation method.

11 Claims, 7 Drawing Sheets

(51) Int. Cl.
  *H04L 25/02* (2006.01)
  *H04J 11/00* (2006.01)
  *H04L 27/26* (2006.01)

(52) U.S. Cl.
  CPC ........... *H04L25/025* (2013.01); *H04J 11/0036* (2013.01); *H04J 11/0063* (2013.01); *H04L 27/2647* (2013.01); *H04B 7/0456* (2013.01)
  USPC ....................................................... 375/260

(56) References Cited

U.S. PATENT DOCUMENTS

| | | | |
|---|---|---|---|
| 2007/0098092 A1* | 5/2007 | Mitran | 375/260 |
| 2007/0098122 A1* | 5/2007 | Tseng et al. | 375/347 |
| 2008/0292015 A1* | 11/2008 | Lee | 375/260 |
| 2010/0323625 A1* | 12/2010 | Kishigami et al. | 455/65 |
| 2013/0034175 A1* | 2/2013 | Kim et al. | 375/260 |

OTHER PUBLICATIONS

Nakano et al., "Adaptive THP Scheme Control for Downlink MU-MIMO Systems", Technical Report of IEICE, RCS2009-293, Mar. 2010, pp. 203-208.

Takeda et al., "A Study of PAPR Reduction Scheme for OFDM Signal Transmission", Technical Report of IEICE, RCS2009-75, Jul. 2009, 6 pages.

Ponnampalam et al. "On DL Precoding for 11ac", IEEE 802.11-10/01119r0, Mediatek, Sep. 2010, 8 pages.

Official Communication issued in International Patent Application No. PCT/JP2012/068363, mailed on Aug. 14, 2012.

English translation of Official Communication issued in corresponding International Application PCT/JP2012/068363, mailed on Feb. 13, 2014.

\* cited by examiner

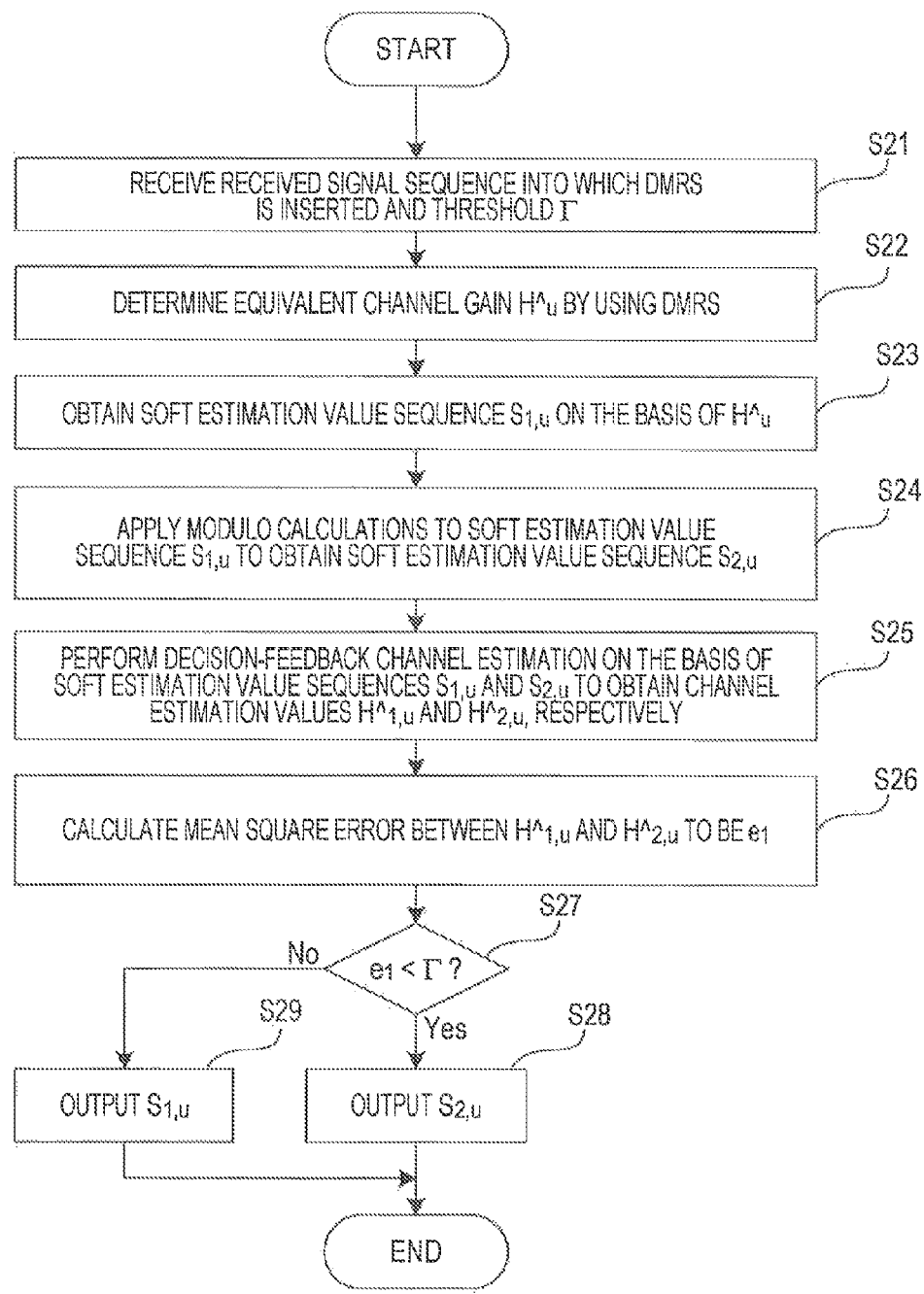

WIRELESS RECEIVING APPARATUS AND PROGRAM

TECHNICAL FIELD

The present invention relates to a wireless receiving apparatus and a program in which nonlinear precoding and linear precoding are utilized selectively or together in a mobile communication technology.

BACKGROUND ART

In a wireless communication system, for providing a variety of broadband information services, there is a constant demand for increasing the transmission rate. It is possible to increase the transmission rate by widening the communication bandwidth. However, since the available frequency band is limited, an improvement in the frequency efficiency is necessary. As a technology for significantly improving the frequency efficiency, attention is being focused on a Multiple Input Multiple Output (MIMO) technology for performing wireless transmission by using a plurality of transmit-and-receive antennas, and MIMO technology has been put to a practical use, for example, in a cellular system and a wireless LAN system. The degree by which the frequency efficiency is improved by using MIMO technology is proportional to the number of transmit-and-receive antennas. However, the number of receive antennas that can be disposed in a terminal device (wireless receiving apparatus) is limited. Thus, the following multi-user MIMO (MU-MIMO) technology is effective for improving the frequency efficiency. In MU-MIMO, a plurality of terminal devices connected at the same time are regarded as a large-scale virtual antenna array, and a signal transmitted from a base station device (wireless transmitting apparatus) to each terminal device is spatially multiplexed.

In MU-MIMO, signals transmitted to individual terminal devices are received by the terminal devices as inter-user interference (IUI). Accordingly, it is necessary to suppress IUI. For example, in 3.9 G mobile wireless communication system (called LTE) Release 8 (Rel. 8), the following linear precoding is employed. In linear precoding, a base station device multiplies a signal in advance by a linear filter calculated on the basis of channel state information supplied from each terminal device, thereby suppressing IUI. However, unless the orthogonality of channels between terminal devices which receive spatially multiplexed signals is high, it is not possible to effectively suppress IUI. Thus, in MU-MIMO based on linear precoding, there is a limitation on improving the frequency efficiency.

These days, attention is being focused on a MU-MIMO technology using nonlinear precoding in which nonlinear processing is performed in a base station device. If a terminal device is capable of performing modulo calculations, a perturbation vector using, as an element, a complex number (perturbation term) obtained by multiplying a certain Gaussian integer by a constant real number may be added to a transmitting signal. Thus, in accordance with the state of channels between a base station device and a plurality of terminal devices, appropriate perturbation vectors are set. Then, even if the orthogonality of channels between terminal devices which receive spatial multiplexed signals is not high, it is possible to considerably reduce required transmission power compared with the use of linear precoding in which perturbation vectors are not added.

The transmission performance of nonlinear precoding considerably varies depending on a search method for perturbation vectors. For example, Vector Perturbation (VP) disclosed NPL 1 is a technique for searching for the optimum perturbation vector from all selectable perturbation vectors. VP implements excellent transmission performance, but on the other hand, an enormous amount of calculations is required. On the other hand, by using a method based on Tomlinson Harashima Precoding (THP) disclosed in NPL 2, a perturbation vector can be simply searched, but transmission performance is considerably decreased compared with the use of VP.

Nonlinear precoding is an effective technique for improving the frequency efficiency. On the other hand, however, in wireless transmission in which modulo calculations, which are required in nonlinear precoding, are performed, a factor in decreasing the performance, which is called modulo loss, is involved. Accordingly, depending on the state of channels, there may be a case in which modulo loss surpasses the effect of reducing required transmission power obtained by nonlinear precoding. In such a case, the transmission performance may be decreased compared with the use of linear precoding. Accordingly, for example, NPL 3 discloses the following method. Processing similar to linear precoding, which does not require modulo calculations, is performed on a signal to be transmitted to a terminal device in which there is only a small effect of reducing transmission power obtained by modulo calculations. In contrast, nonlinear precoding based on THP using modulo calculations is performed only on a signal to be transmitted to a terminal device in which the level of IUI is high, and thus, a great effect of suppressing transmission power by performing modulo calculations can be expected.

The application of nonlinear precoding is not restricted to MU-MIMO. For example, in NPL 4, nonlinear precoding is utilized in order to reduce the peak to average power ratio (PAPR), which causes a problem in orthogonal frequency division multiplex (OFDM) transmission. In this case, too, a determination as to whether nonlinear precoding will be performed is made depending on actually measured PAPR and modulo loss produced in a wireless receiving apparatus.

Nonlinear precoding is performed, provided that modulo calculations are performed in a terminal device. However, since nonlinear precoding involves a factor in decreasing the performance, which is called modulo loss, there may be a case in which linear precoding and nonlinear precoding are adaptively switched in accordance with, for example, the state of channels, as in NPL 3. It is thus necessary for a terminal device to know whether or not modulo calculations will be required for a received signal or a perturbation term is added to a transmitted signal. Accordingly, NPL 5 discusses a technique for supplying control information which enables a terminal device to know whether modulo calculations will be required. However, supplying control information increases the overhead, thereby imposing a restriction on an improvement in the frequency efficiency.

CITATION LIST

Non Patent Literature

NPL 1: B. M. Hochwald, et al., "A vector-perturbation technique for near-capacity multiantenna multiuser communication-Part II: Perturbation", IEEE Trans. Commun., Vol. 53, No. 3, March 2005.

NPL 2: M. Joham, et al., "MMSE approaches to multiuser spatio-temporal Tomlinson-Harashima precoding", Proc. 5th Int. ITG Conf. on Source and Channel Coding, Erlangen, Germany, January 2004.

NPL 3: Nakano, et al., "Adaptive THP scheme control for downlink MU-MIMO systems", Technical Report of IEICE, RCS2009-293, March 2010.

NPL 4: Takeda, et al., "A study of PAPR reduction scheme for OFDM signal transmission", Technical Report of IEICE, RCS2009-75, pp. 131-136, July 2009.

NPL 5: IEEE 802.11-10/01119r0, Mediatek, "On DL precoding for 11ac", September 2010.

SUMMARY OF INVENTION

Technical Problem

When nonlinear precoding and linear precoding are used selectively or together, it is necessary for a terminal device to know whether modulo calculations will be required for a received signal. However, if such information is supplied to a terminal device by means of control information, the overhead increases.

In view of this problem, it is an object of the present invention to provide a wireless receiving apparatus which is capable of estimating whether or not modulo calculations will be required for a received signal without the need to receive control information, and also to provide a program for the wireless receiving apparatus.

Solution to Problem

According to the present invention, there is provided a wireless receiving apparatus which includes at least one antenna and which receives a signal subjected to precoding from a wireless transmitting apparatus. The signal subjected to precoding includes a reference signal and a data signal disposed in different wireless resources. The wireless receiving apparatus includes: first channel state information obtaining means for obtaining first channel state information concerning a channel between the wireless receiving apparatus and the wireless transmitting apparatus, on the basis of the received signal and the reference signal; second channel state information obtaining means for obtaining second channel state information concerning a channel between the wireless receiving apparatus and the wireless transmitting apparatus, on the basis of the received signal and the first channel state information; determining means for determining a method for demodulating a desired signal from the signal subjected to precoding, on the basis of at least part of the first and second channel state information; and demodulating means for demodulating a desired signal from the signal subjected to precoding, on the basis of the determined method.

As the precoding, first precoding which does not include nonlinear processing and second precoding which includes nonlinear processing may be utilized selectively or together.

The first channel state information may indicate a first channel estimation value obtained on the basis of channel estimation using the received signal and the reference signal. The second channel state information indicates a channel estimation value on the basis of the first channel state information and the received signal and on the basis of a decision-feedback channel estimation technique using a provisional decision value sequence related to the data signal.

The channel estimation value obtained on the basis of the decision-feedback channel estimation technique may include one or both of a second channel estimation value and a third channel estimation value, the second channel estimation value being obtained on the basis of the decision-feedback channel estimation technique which is performed assuming that the precoding is the first precoding, the third channel estimation value being obtained on the basis of the decision-feedback channel estimation technique which is performed assuming that the precoding is the second precoding.

The determining means may obtain one of a first mean square error between the first channel estimation value and the second channel estimation value and a second mean square error between the first channel estimation value and the third channel estimation value, and may determine a method for demodulating a desired signal from the signal subjected to precoding, on the basis of a value of the obtained mean square error.

In a case in which the obtained mean square error is smaller than a first threshold, the determining means may determine that the data signal has been subjected to the precoding related to the obtained mean square error. In a case in which the obtained mean square error is greater than the first threshold, the determining means may determine that the data signal has been subjected to the precoding which is not related to the obtained mean square error.

The determining means may obtain a first mean square error between the first channel estimation value and the second channel estimation value and a second mean square error between the first channel estimation value and the third channel estimation value. As a result of comparing the first mean square error and the second mean square error with each other, the determining means may determine that the data signal has been subjected to the precoding related to a mean square error having a smaller value, and may determine a method for demodulating a desired signal from the signal subjected to precoding.

The determining means may obtain a third mean square error between the second channel estimation value and the third channel estimation value, and may determine a method for demodulating a desired signal from the signal subjected to precoding, on the basis of a value of the third mean square error.

In a case in which the third mean square error is smaller than a first threshold, the determining means may determine that the data signal has been subjected to the first precoding. In a case in which the third mean square error is greater than the first threshold, the determining means may determine that the data signal has been subjected to the second precoding.

The first threshold may be a value related to a reception quality including an average received-signal-to-noise ratio or an average received-signal-to-interference-plus-noise ratio measured by the wireless receiving apparatus.

According to the present invention, there is provided a program for causing a computer to function as the individual means of the above-described wireless receiving apparatus.

Advantageous Effects of Invention

According to the present invention, in a wireless communication system in which nonlinear precoding and linear precoding are utilized selectively or together, a wireless receiving apparatus is able to estimate whether or not modulo calculations will be necessary without the need for a wireless transmitting apparatus to supply control information to the wireless receiving apparatus. Thus, it is possible to suppress an increase in the overhead, which would otherwise be caused by control information.

BRIEF DESCRIPTION OF DRAWINGS

FIG. 7 is a flowchart illustrating another series of signal processing operations performed by the modulo estimating unit.

DESCRIPTION OF EMBODIMENTS

An embodiment to which a wireless communication system of the present invention is applied will be described below with reference to the drawings. The elements and features discussed in this embodiment is only one mode for understanding the invention, and it is not intended that the scope of the invention be restricted to or construed by this embodiment.

This embodiment is applied to a wireless communication system in which a signal subjected to nonlinear precoding is transmitted from a wireless transmitting apparatus and is received by a wireless receiving apparatus. In the following description, it is assumed that MU-MIMO transmission is performed in a system in which U terminal devices 200 (also referred to as "wireless receiving apparatuses"; see FIG. 4, which will be discussed later) each including one receive antenna are connected to a base station device 100 (also referred to as a "wireless transmitting apparatus"; see FIG. 1, which will be discussed later) including $N_t$ transmit antennas and being capable of performing nonlinear precoding. In this case, it is assumed that $N_t=U$. It is also assumed that OFDM signal modulation having $N_c$ subcarriers (subcarrier waves) is applied to a signal to be transmitted. It is also assumed that the base station device 100 obtains channel state information concerning channels between the base station device 100 and the individual terminal devices 200 by means of control information supplied from the associated terminal devices 200, and performs precoding on transmission data for each subcarrier, on the basis of the channel state information.

Channel state information concerning a channel between the base station device and each terminal device will first be defined. In this embodiment, a quasi-static frequency selective fading channel is assumed. In this case, "quasi-static" means that time fluctuations in a channel within one OFDM signal is negligible. When the complex channel gain of the k-th subcarrier between the n-th transmit antenna (n=1 to $N_t$) and the u-th terminal device (u=1 to U) is represented by $h_{u,n}(k)$, the channel matrix H(k) is defined as equation (1).

[Math. 1]

$$H(k) = \begin{pmatrix} h_{1,1}(k) & \cdots & h_{1,N_t}(k) \\ \vdots & \ddots & \vdots \\ h_{U,1}(k) & \cdots & h_{U,N_t}(k) \end{pmatrix} \quad (1)$$

[Base Station Device]

Figure 1:
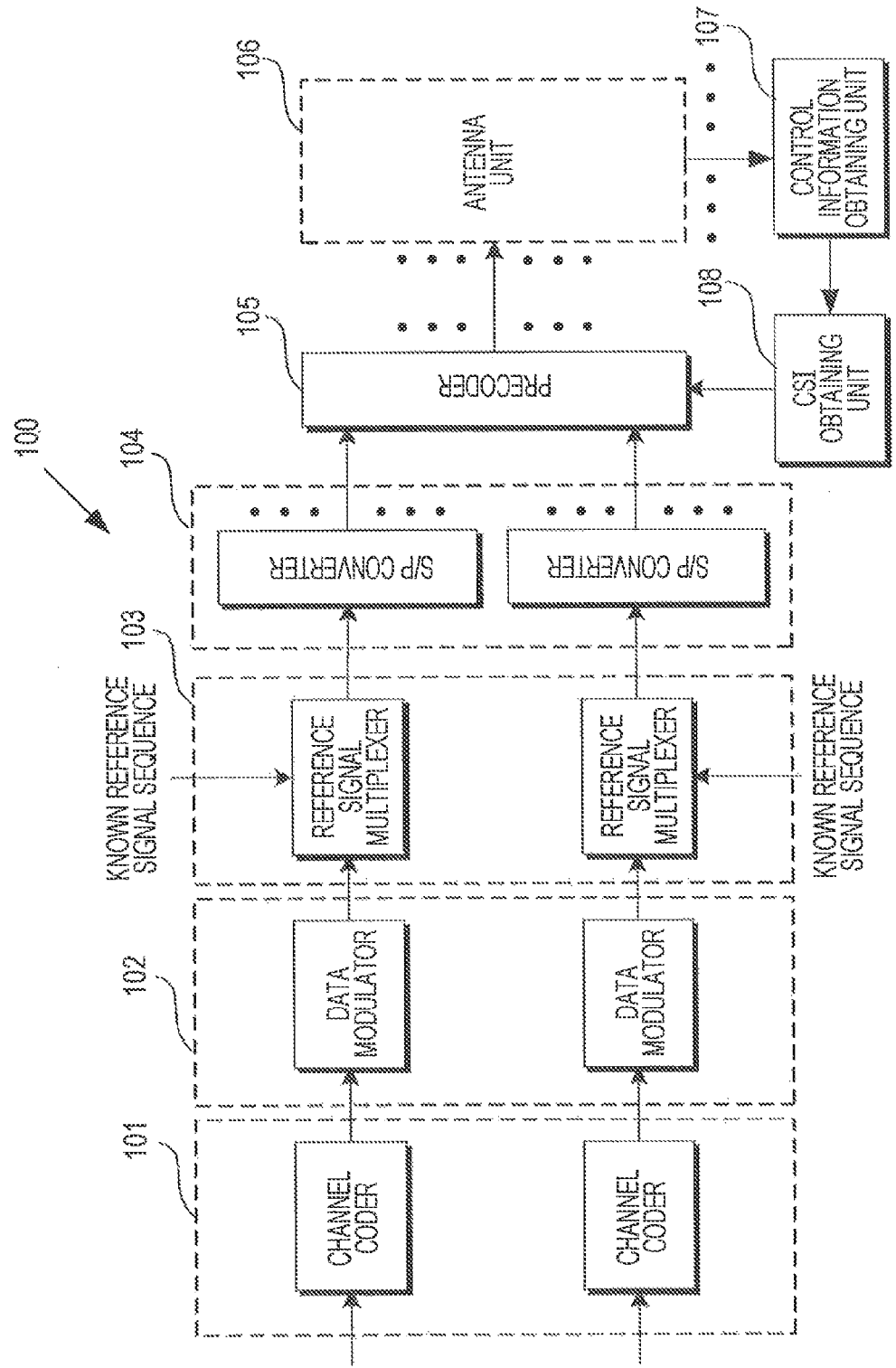
FIG. 1 is a block diagram illustrating the configuration of a base station device.

FIG. 1 is a block diagram illustrating the configuration of a base station device. A base station device 100 includes, as shown in FIG. 1, a channel coder 101, a data modulator 102, a reference signal multiplexer 103, an S/P converter 104, a precoder 105, an antenna unit 106, a control information obtaining unit 107, and a CSI obtaining unit 108. Concerning a precoder 105, the same number as the number of sub carriers $N_c$ are disposed, and concerning an antenna unit 106, the same number as the number of transmit antennas $N_t$ are disposed.

A transmission data sequence to be transmitted to each terminal device is subjected to channel coding in the channel coder 101, and is then modulated to, for example, QPSK or 16QAM data, in the data modulator 102. The modulated data output from the data modulator 102 is input into the reference signal multiplexer 103. In the reference signal multiplexer 103, a known reference signal sequence for enabling each terminal device 200 to perform channel estimation is multiplexed with the data output from the data modulator 102.

Reference signals for the individual terminal devices are multiplexed with each other such that they are orthogonal to each other, so that they can be separated from each other in the received terminal devices 200. As the reference signals, two reference signals, that is, a channel-estimating reference signal (CRS) and a demodulating reference signal (DM-RS), are multiplexed. CRS is used for estimating the channel matrix expressed by equation (1), while DM-RS is used for estimating information concerning precoding, which is discussed later. Although a multiplexing technique for CRS and DM-RS is not particularly restricted, CRSs are disposed such that they are orthogonal to each other between transmit antennas, and DM-RSs are disposed such that they are orthogonal to each other between the terminal devices 200 connected to the base station device 100. As a technique for implementing orthogonal multiplexing, one of time division multiplexing, orthogonal frequency division multiplexing, and orthogonal code division multiplexing, or a combination of a plurality of orthogonal multiplexing techniques may be considered. As long as DM-RS is concerned, spatial division multiplexing is also possible, and DM-RS may be multiplexed with a data signal to be transmitted to another terminal device in a spatial division multiplexing manner. No matter whichever technique is used, the interference which may influence a data signal is desirably minimized to zero.

A description will be given below, assuming that a data signal and a reference signal are subjected to orthogonal frequency division multiplexing and that required information can be ideally estimated in each terminal device 200 in this embodiment.

A signal output from the reference signal multiplexer 103 is input into the S/P converter 104, and is serial-to-parallel converted to $N_c$ parallel signal sequences corresponding to the $N_c$ samples. The same number of sequences as the number of subcarriers $N_c$ are output from the S/P converter 104 and are input into the precoders 105 associated with the subcarriers.

The precoders 105 will be discussed below. In the following description, the precoder 105 for the k-th subcarrier will be discussed. First, a case in which a data signal component included in the output from the reference signal multiplexer 103 is input into the precoder 105 will be described.

Figure 2:
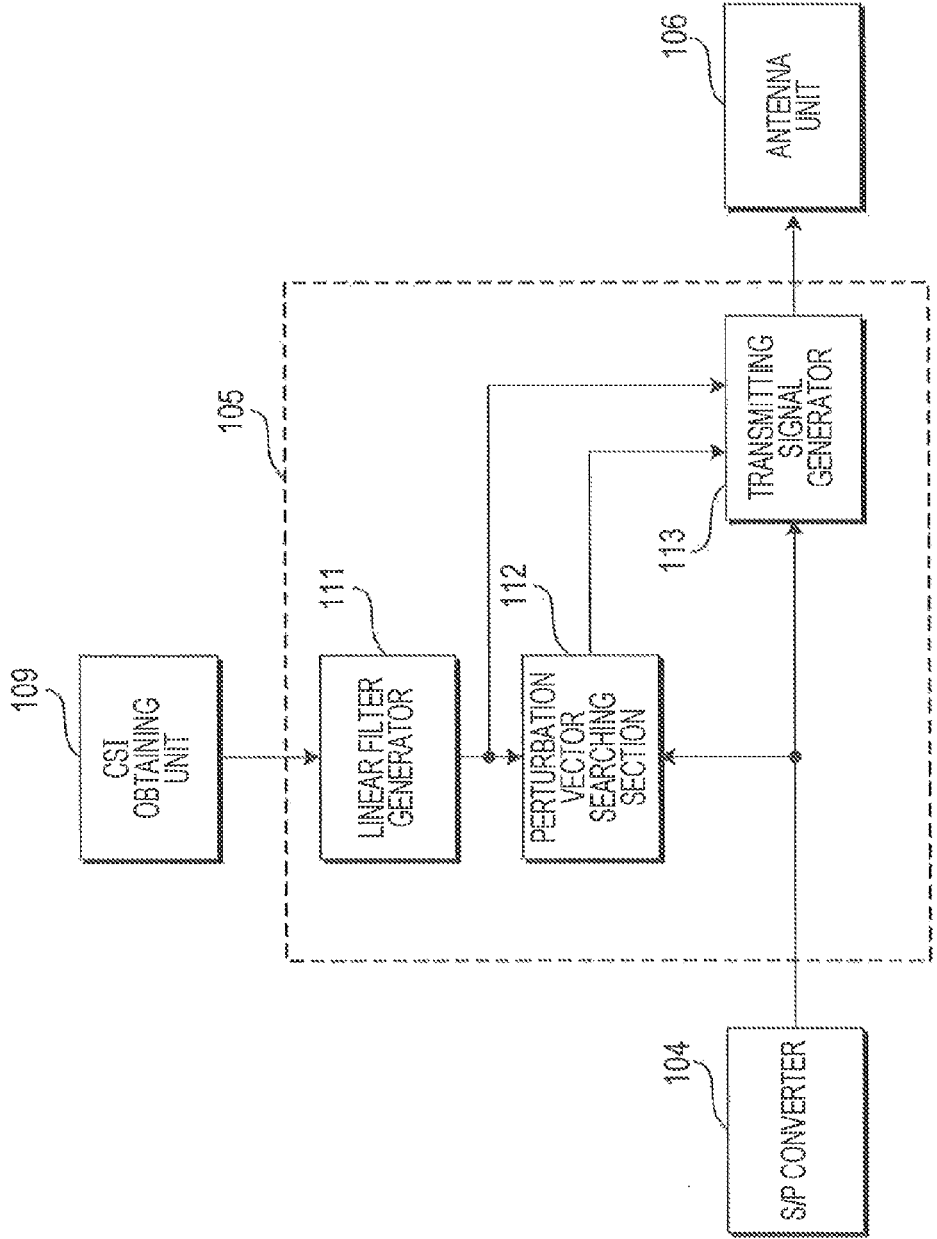
FIG. 2 is a block diagram illustrating the configuration of a precoder.

The configuration of the precoder 105 is shown in FIG. 2. The precoder 105 includes, as shown in FIG. 2, a linear filter generator 111, a perturbation vector searching section 112, and a transmitting signal generator 113. Concerning transmission data to be transmitted to each terminal device, the k-th subcarrier component $\{d_u(k); u=1$ to $U\}$ output from the S/P converter 104 and the channel matrix H(k) of the k-th subcarrier output from the CSI obtaining unit 109 are input into the precoder 105. H(k), which is based on the above-described CRS, is estimated in the terminal device 200 and is supplied to the base station device 100. A description will be given below, assuming that H(k) is ideally obtained in the CSI obtaining unit 109. For simple representation, H(k) will be indicated by omitting the index k.

Signal processing performed by the precoder 105 differs depending on the precoding method assumed by the base station device 100. A description will be given below of signal processing based on Vector perturbation (VP) technique disclosed in the literature of B. M. Hochwald, et al.

A linear filter W is first generated in the linear filter generator 111. As the linear filter, a linear filter based on ZF ($W=H^{-1}$) or MMSE ($W=H^H(HH^H+\alpha I)^{-1}$) is generated. $A^{-1}$ denotes an inverse matrix of a matrix A, and $A^H$ denotes an adjoint matrix (Hermitian transpose matrix) of a matrix A. $\alpha$ denotes an interference term, which is determined in accordance with transmission power, etc., and which may be set to be the reciprocal of the transmitted-signal-to-received-noise ratio for one terminal device.

Then, transmission data vectors $d=[d_1, \ldots, d_U]^T$ and the linear filter W are input into the perturbation vector searching section 112, and the perturbation vector searching section 112 searches for a perturbation vector. $A^T$ denotes a transpose matrix of a matrix A. Vectors $x=[x_1, \ldots, x_U]^T=(d+Z)$ obtained by adding a certain perturbation vector $Z=[z_1, \ldots, z_U]^T$ to d will be called transmission code vectors. $\{z_u; u=1 \text{ to } U\}$ denotes a perturbation term for the u-th terminal device, which is a complex number obtained by multiplying a Gaussian integer by a constant M. $\{x_u; u=1 \text{ to } U\}$ will be called a transmission code for the u-th terminal device. Then, x is multiplied by the linear filter W so as to calculate provisional transmission signal vectors $s=[s_1, \ldots, s_{Nt}]^T=W(d+Z)$. Generally, the constant M is determined in accordance with the data modulation method used in the data modulator 102. For example, it is desirable that $M=2\times(2^{1/2})$ if QPSK is used and that $M=8\times(10^{-1/2})$ if 16QAM is used. However, the constant M may be a different value. It is necessary that the base station device 100 share the constant M with the terminal device 200, which will be discussed later. If M is determined in accordance with the modulation method, as stated above, the base station device 100 notifies the terminal device 200 of the modulation method, so that the terminal device 200 may know the value of M. Even if M is not determined in accordance with the modulation method, the base station device 100 determines the value of M with the terminal device in advance.

Any perturbation term is applicable to Z. In VP, Z that minimizes required transmission power is searched. That is, Z is calculated by solving the minimization problem expressed by equation (2).

[Math. 2]

$$Z = \underset{Z \in M(Z_r+jZ_r)}{\operatorname{argmin}} \|W(d+Z)\|^2 \quad (2)$$

where $Z_r$ denotes the set of all integers.

Z may be determined by a technique, such as Sphere encoding (SE). Since Z is obtained by solving the minimization problem, it may be 0 depending on the state of a channel. That is, this means that the transmission code $x_u$ for the u-th terminal device may be $x_u=d_u$ or $x_u=d_u+z_u$ depending on the state of a channel. Hereinafter, a transmission code $x_u=d_u$ to which a perturbation term is not added is referred to as a "first code", and a transmission code $x_u=d_u+z_u$ to which a perturbation term is added is referred to as a "second code".

The transmission code $x_u$ is determined to be a first code or a second code in accordance with the state of the channel. Alternatively, a case in which the base station device 100 selectively determines whether $x_u$ will be a first code or a second code may be considered. For example, if the number of multiplex terminal devices is small, all transmission codes may always be set to be first codes, and if the number of multiplex terminal devices is large, some transmission codes may be set to be second codes. The opposite case may be considered, and the reason for this is because nonlinear precoding requires a larger amount of calculations than linear precoding. Moreover, since a required amount of calculations is enormous for the minimization problem expressed by equation (2), for example, optimum perturbation terms may be searched for a certain number of terminal devices, and perturbation terms may not be searched for the remaining terminal devices. In this case, transmission codes transmitted to terminal devices for which perturbation terms have been searched may be second codes, while transmission codes transmitted to terminal devices for which perturbation terms have not been searched are always first codes. Additionally, the above-described modulo loss produces a great influence if the signal-to-noise ratio (SNR) is low or if the modulation order is low. Accordingly, transmission codes to be transmitted to terminal devices in which the received SNR is low or the modulation order is low are restricted to first codes. Then, the influence of modulo loss can be suppressed. In a case in which it is selectively determined that a transmission code will be a first code or a second code, the minimization problem expressed by equation (2) is reduced to equation (3) if $z_{1'}$ to $z_{U'}$ are perturbation terms for terminal devices to which first codes will be transmitted as transmission codes.

[Math. 3]

$$Z = \underset{Z \in M(Z_r+jZ_r), z_{1'}=\ldots=z_{U'}=0}{\operatorname{argmin}} \|W(d+Z)\|^2 \quad (3)$$

As discussed above, in VP, a determination as to whether or not perturbation terms will be added to transmission codes may vary depending on the situation. This is also applied if, instead of VP, Tomlinson-Harashima Precoding (THP) proposed by Harashima et al. is assumed as nonlinear precoding. In THP, perturbation terms are not found by the minimization problem expressed by equation (2) or (3), but are sequentially determined for individual terminal devices. However, THP is the same as VP in terms of the fact that values of perturbation terms change in accordance with channel state information or transmission data. Additionally, NPL 3 discloses a case in which it is determined whether perturbation terms will be added in accordance with the value of inter-user interference. In this case, too, both of first codes and second codes are used.

According to the method described above, a perturbation term Z is output from the perturbation vector searching section 112. In the precoder 105, W, d, and z are input into the transmitting signal generator 113, and transmission signal vectors $s=\beta W(d+Z)$ are calculated and are output as the output of the precoder 105. $\beta$ is a power normalizing term for making signal power of transmission signal vectors constant. In this case, transmission power is normalized for each sub-carrier. However, transmission power may be normalized for each sub-band constituted by a plurality of subcarriers or for each OFDM signal.

Then, a description will be given of a case in which reference signals (CRS and DM-RS) are input into the precoder 105. In the case of CRS, signal processing for precoding is not performed, and thus, CRS is output without being subjected to processing. In the case of DM-RS, although precoding similar to that for transmission data is performed, a perturbation vector is not added.

Figure 3:
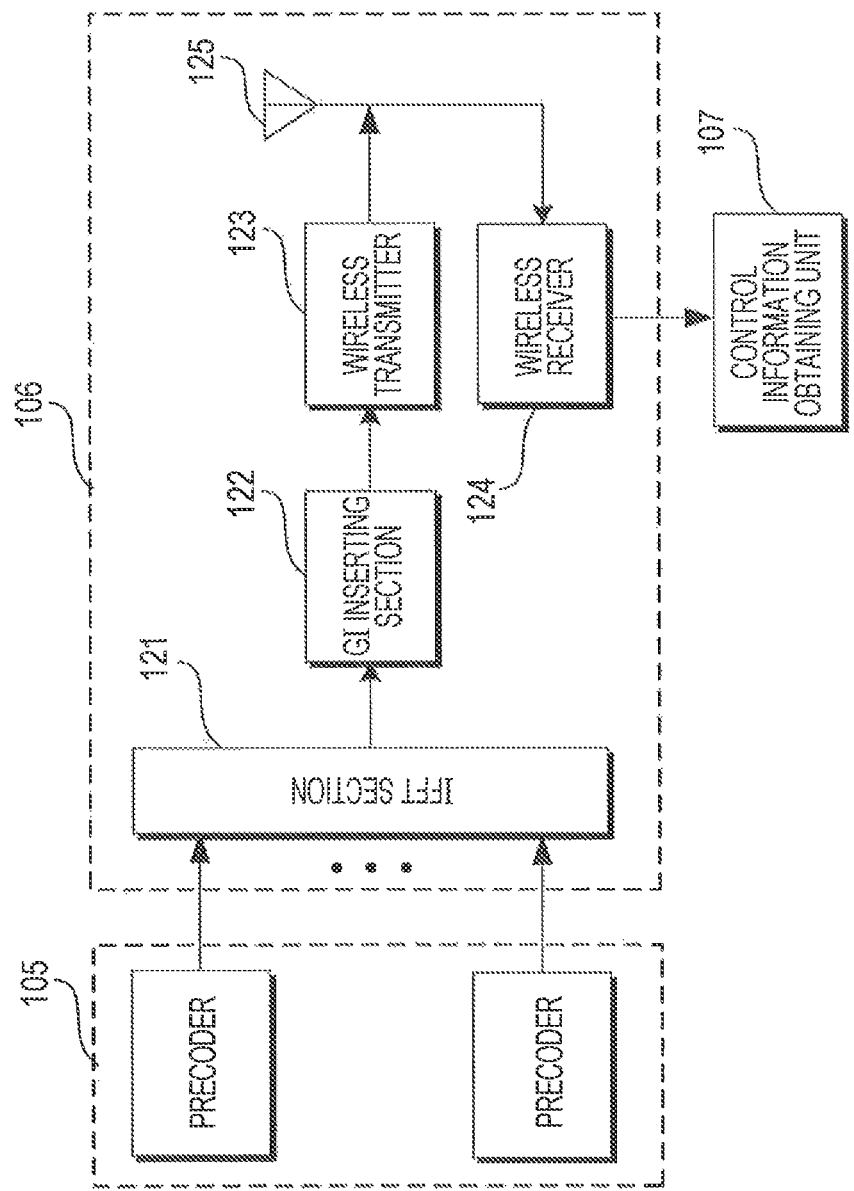
FIG. 3 is a block diagram illustrating the configuration of an antenna unit.

Outputs corresponding to the individual subcarriers of the precoder 105 are input into the antenna units 106 of the associated transmit antennas. The configuration of the antenna unit 106 is shown in FIG. 3. The antenna unit 106 includes, as shown in FIG. 3, an IFFT section 121 a GI inserting section 122, a wireless transmitter 123, a wireless receiver 124, and an antenna 125. In each antenna unit 106, outputs from the associated precoders 105 are input into the IFFT section 121, and $N_c$-point inverse discrete Fourier transform (IDFT) or inverse fast Fourier transform (IFFT) is applied to the outputs from the associated precoders 105, thereby generating an OFDM signal having $N_c$ subcarriers. The OFDM signal is then output from the IFFT section 121. The OFDM signal output from the IFFT section 121 is input into the GI inserting section 122. After adding a guard interval to the OFDM signal, the OFDM signal is input into the wireless transmitter 123. In the wireless transmitter 123, a baseband transmitting signal is converted into a radio frequency (RF) transmitting signal. The signal output from the wireless transmitter 123 is transmitted from the transmit antenna 125.

[Terminal Device]

Figure 4:
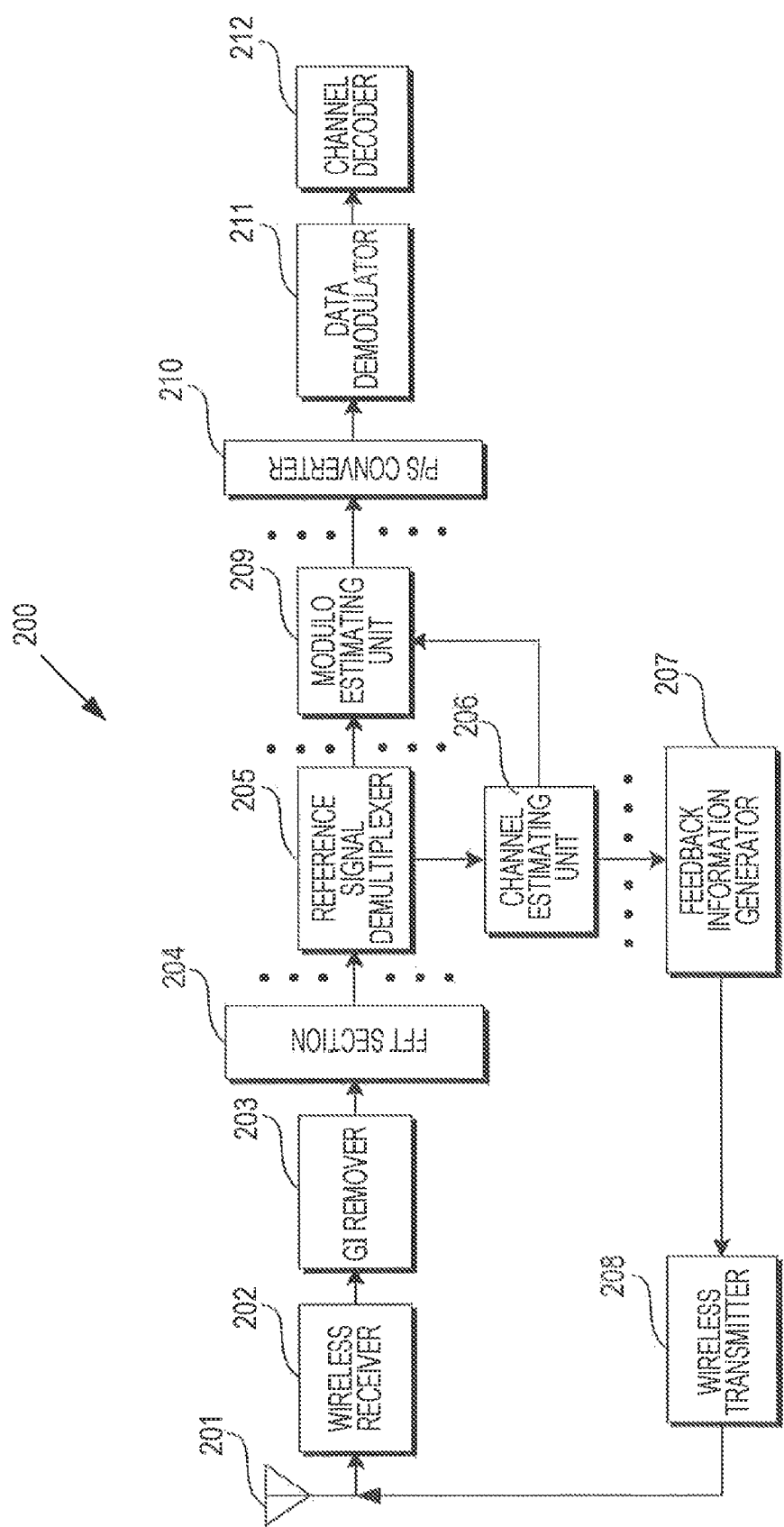
FIG. 4 is a block diagram illustrating the configuration of a terminal device.

FIG. 4 is a block diagram illustrating the configuration of a terminal device. The terminal device 200 includes, as shown in FIG. 4, an antenna 201, a wireless receiver 202, a GI remover 203, an FFT unit 204, a reference signal demultiplexer 205, a channel estimating unit 206, a feedback information generator 207, a wireless transmitter 208, a modulo estimating unit 209, a P/S converter 210, a data demodulator 211, and a channel decoder 212.

In the terminal device 200, a signal received by the receive antenna 201 is input into the wireless receiver 202, and is converted into a baseband signal. The converted baseband signal is input into the GI remover 203, and a guard interval is removed from the baseband signal. Then, the baseband signal is input into the FFT unit 204. In the FFT unit 204, $N_c$-point discrete Fourier transform (DFT) or fast Fourier transform (FFT) is applied to the input signal, and the input signal is transformed into $N_c$ subcarrier components. An output from the FFT unit 204 is input into the reference signal demultiplexer 205. In the reference signal demultiplexer 205, the input signal is demultiplexed into a data signal component, a CRS component, and a DM-RS component. Then, the data signal component is output to the modulo estimating unit 209, and CRS and DM-RS are output to the channel estimating unit 206.

In the channel estimating unit 206, channel estimation is performed on the basis of the input CRS and DM-RS, which are known reference signals. Known reference signal sequences for the individual terminal devices 200 have been transmitted from the base station device 100 such that they are orthogonal to each other. Channel estimation using CRS will be discussed first. CRS has been transmitted without being subjected to precoding. Accordingly, from the channel matrix H(k) expressed by equation (1), it is possible to estimate a component associated with each terminal device 200 (for example, the u-row component in H(k) for the u-th terminal device). If CRS is intermittently multiplexed with all wireless resources, it is not possible to directly estimate channel state information for all subcarriers. However, if CRS is multiplexed in a time axis and in a frequency axis in an appropriate manner in which the sampling theorem is satisfied, it is possible to estimate channel state information for all subcarriers by performing appropriate interpolation. A specific channel estimating method is not particularly restricted, and two-dimensional MMSE channel estimation, for example, may be utilized.

Channel state information estimated by using CRS is input into the feedback information generator 207. The feedback information generator 207 generates information to be fed back to the base station device 100 in accordance with the format of channel state information to be fed back by each terminal device 200. In the present invention, the format of channel state information is not restricted. For example, estimated channel state information may be quantized with a finite number of bits, and the quantized information may be fed back. Information generated in the feedback information generator 207 is input into the wireless transmitter 208, and is transmitted to the base station device 100.

Then, channel estimation using DM-RS will be discussed. Unlike CRS, DM-RS has been transmitted after being subjected to partial precoding. Accordingly, by using DM-RS, it is possible to obtain channel state information for demodulating a data signal which has been subjected to precoding. More specifically, in the case of the u-th terminal device, it is possible to estimate the u-row, u-column component in a matrix $\beta(k)H(k)W(k)$ in which the channel matrix $H(k)$ is multiplied by the linear filter $W(k)$ and the resulting value is further multiplied by the power normalizing coefficient $\beta(k)$. As in CRS, there may be a case in which DM-RS is intermittently multiplexed with all wireless resources. However, it is possible to obtain information for demodulating data signals for all subcarrier components by performing appropriate interpolation. Information obtained by using DM-RS is input into the modulo estimating unit 209.

Figure 5:
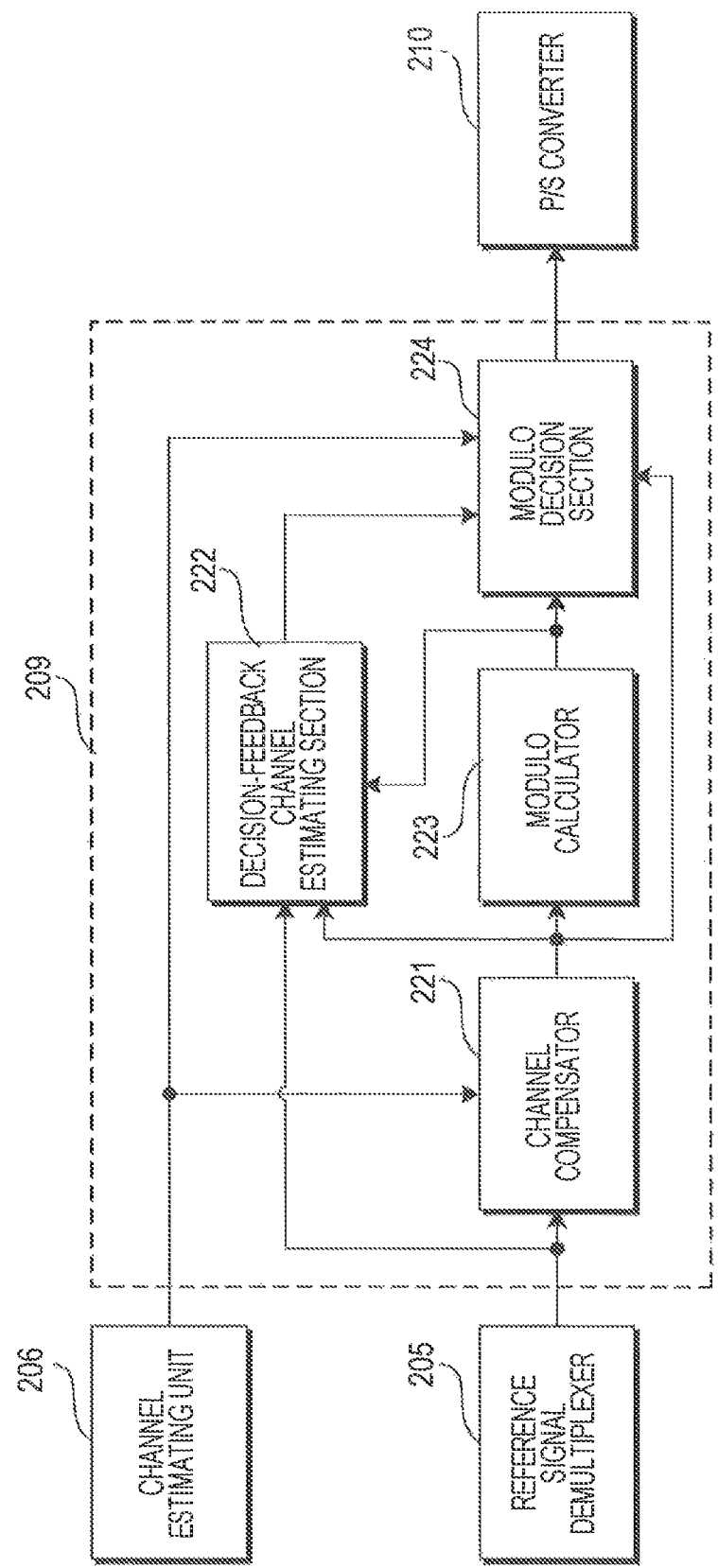
FIG. 5 is a block diagram illustrating the configuration of a modulo estimating unit.

FIG. 5 is a block diagram illustrating the configuration of the modulo estimating unit 209. The modulo estimating unit 209 includes, as shown in FIG. 5, a channel compensator 221, a decision-feedback channel estimating section 222, a modulo calculator 223, and a modulo decision section 224.

Figure 6:
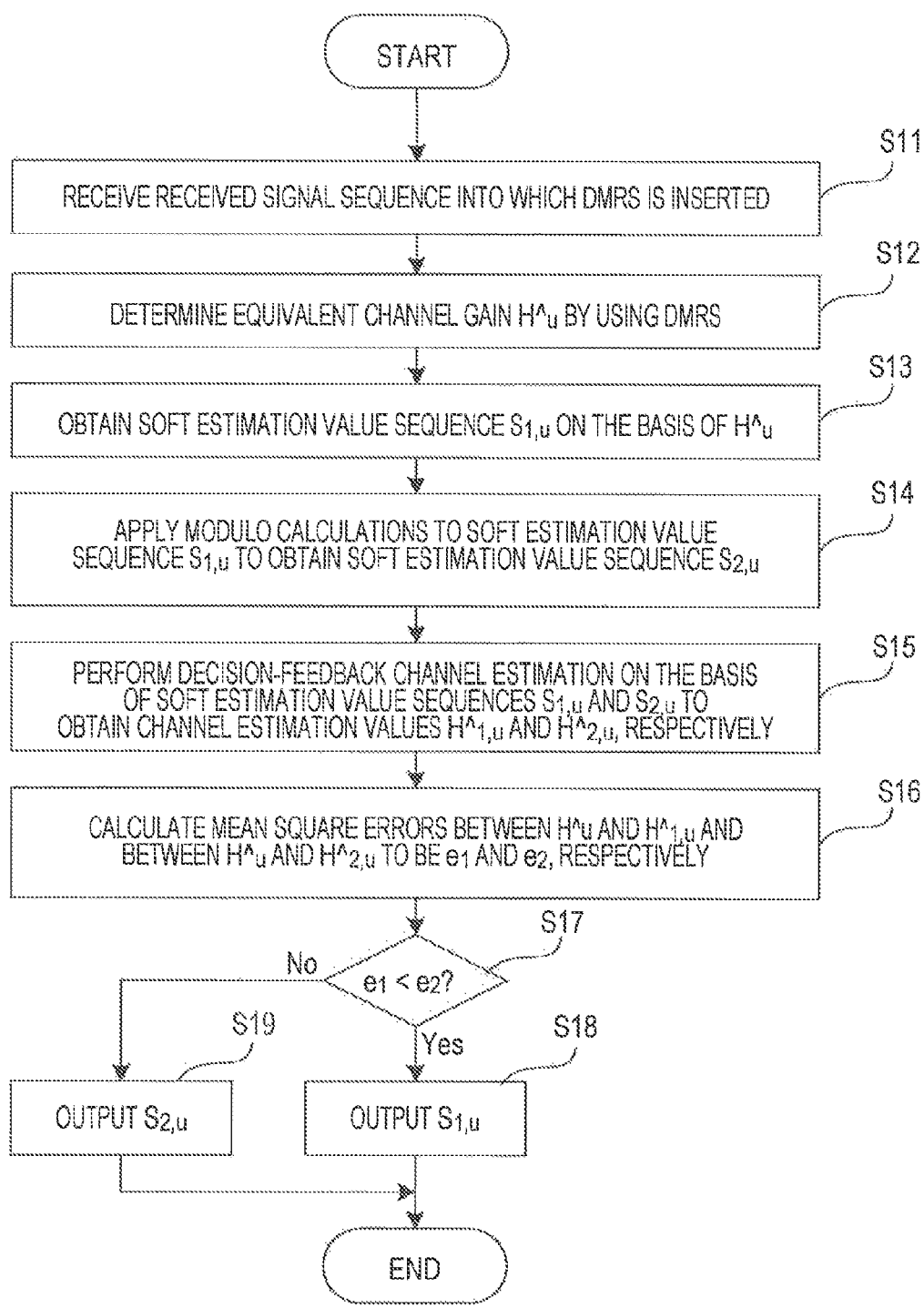
FIG. 6 is a flowchart illustrating a series of signal processing operations performed by the modulo estimating unit.

A description will be given below of processing performed by the modulo estimating unit 209 upon receiving a received signal sequence into which DM-RS is inserted. FIG. 6 is a flowchart illustrating a series of signal processing operations performed by the modulo estimating unit.

A data signal component output from the reference signal demultiplexer 205 and channel state information obtained by using DM-RS output from the channel estimating unit 206 are input into the modulo estimating unit 209 (step S11). Equivalent channel gain $\hat{H}_u(k)$ (first channel state information), which is information estimated in the channel estimating unit 206 (first channel state information obtaining means) by using DM-RS, is input into the channel compensator 221 from the channel estimating unit 206 (step S12).

In the modulo estimating unit 209, first, the channel compensator 221 performs equalizing processing on a data signal component so as to calculate a first provisional decision value sequence $\{S_{1,u}(k) k=1 \text{ to } N_c \text{ (except for reference signal components)}\}$ on the basis of $\hat{H}_u(k)$ (step S13). The data signal component $\{R_u(k) k=1 \text{ to } N_c \text{ (except for reference signal components)}\}$ is given by equations (4).

[Math. 4]

$$R_u(k) = \hat{H}_u(k)(d_u(k) + z_u(k)) + G_u(k) + N_u(k) \quad (4)$$

$$\hat{H}_u(k) = \beta(k)h_u(k)w_u(k)$$

$$G_u(k) = \sum_{\substack{i=1 \\ \neq U}}^{U} h_u(k)w_i(k)(d_i(k) + z_i(k))$$

In equations (4), $h_u(k)$ denotes the u-row component of $H(k)$, and $w_u(k)$ denotes the u-column component of $W(k)$. $G_u(k)$ is the residual IUI. The residual IUI becomes 0 if the linear filter is based on ZF. $N_u(k)$ is noise.

$S_{1,u}(k)$ is obtained by dividing $R_u(k)$ by the equivalent channel gain $\hat{H}_u(k)$. That is, $S_{1,u}(k)=(d_u+z_u)+G_u(k)/\hat{H}_u(k)+N_u(k)/\hat{H}_u(k)$. The first provisional decision value sequence is output from the channel compensator 221 as the output.

The first provisional decision value sequence $\{S_{1,u}(k)\}$ is input into the modulo calculator 223. Modulo calculations with a modulo width M are performed so as to calculate a second provisional decision value sequence $\{S_{2,u}(k); k=1$ to $N_c$ (except for reference signal components)$\}$ by equation (5) (step S14).

[Math. 5]

$$S_{2,u}(k) = S_{1,u}(k) - M \cdot \text{floor}\left(\frac{S_{1,u}(k)}{M} + \frac{1}{2}(1+j)\right) \quad (5)$$

$$= S_{1,u}(k) + z_{r,u}(k)$$

In this case, if the residual IUI and noise power are sufficiently small, $z_u(k)+z_{r,u}(k)\approx 0$, and thus, the influence of a perturbation term can be eliminated. The modulo width M is the same value as the constant M discussed in a description of the precoder 105.

As discussed in a description of the precoder 105, a transmission code transmitted to the u-th terminal device is a first code or a second code. It is known that, if the transmission code is a first code, the bit error rate (BER) of the second provisional decision value sequence $S_{2,u}(k)$ degrades in comparison with that of the first provisional decision value sequence $S_{1,u}(k)$. For example, in the case of QPSK modulation, BER of $S_{2,u}(k)$ is about twice as that of $S_{1,u}(k)$ under the same received SNR. In contrast, if the transmission code is a second code, BER of $S_{1,u}(k)$ considerably degrades in comparison with that of $S_{2,u}(k)$. Additionally, in the channel decoder 212, which will be discussed later, it is necessary to calculate the log likelihood ratio (LLR) for provisional decision value sequences. An appropriate LLR calculation method for a first code is different from that for a second code. If an inappropriate calculation method is used, BER considerably degrades. Accordingly, it is necessary for the modulo estimating unit 209 to accurately determine whether a transmission code is a first code or a second code. A method for estimating whether a transmission code is a first code or a second code in this embodiment will be discussed below.

First, a data signal component $\{R_u(k)\}$, a first provisional decision value sequence $\{S_{1,u}(k)\}$, a second provisional decision value sequence $\{S_{2,u}(k)\}$, and a perturbation term $\{z_{r,u}(k)\}$ which is output as a result of performing modulo calculations for obtaining the second provisional decision value sequence are input into the decision-feedback channel estimating section 222 (second channel state information obtaining means), and decision-feedback channel estimation is performed. A decision-feedback channel estimation technique is not particularly restricted. In this embodiment, a decision-feedback channel is estimated by performing reverse modulation on $\{R_u(k)\}$ by using $\{S_{1,u}(k)\}$, $\{S_{2,u}(k)\}$, and $\{z_{r,u}(k)\}$. That is, a first channel estimation value $\hat{H}_{1,u}(k)$ (second channel state information) based on the first provisional decision value sequence $\{S_{1,u}(k)\}$ is obtained by calculating $\hat{H}_{1,u}(k)=R_u(k)/S_{1,u}(k)$, and a second channel estimation value $\hat{H}_{2,u}(k)$ (third channel state information) based on the second provisional decision value sequence $\{S_{2,u}(k)\}$ is obtained by calculating $\hat{H}_{2,u}(k)=R_u(k)/(S_{2,u}(k)+z_{r,u}(k))$ (step S15). The first and second channel estimation values obtained by the decision-feedback channel estimating section 222 (second channel state information obtaining means) are input into the modulo decision section 224.

In addition to the output from the decision-feedback channel estimating section 222, the equivalent channel gain $\hat{H}_u(k)$ obtained by using DM-RS output from the channel estimating unit 206, the first provisional decision value sequence $\{S_{1,u}(k)\}$, and the second provisional decision value sequence $\{S_{2,u}(k)\}$ are input into the modulo decision section 224 (determining means). The modulo decision section 224 first calculates information $e_1$ related to the mean square error between the equivalent channel gain $\hat{H}_u(k)$ and the first propagation channel estimation value $\hat{H}_{1,u}(k)$ and information $e_2$ related to the mean square error between the equivalent channel gain $\hat{H}_u(k)$ and the second propagation channel estimation value $\hat{H}_{2,u}(k)$ (step S16). A calculation method for $e_1$ and $e_2$ are not particularly restricted, and $e_1$ and $e_2$ may be calculated, for example, as follows.

In this embodiment, since DM-RS and a data signal are subjected to orthogonal frequency division multiplexing, it is not possible to obtain $\hat{H}_u(k)$, $\hat{H}_{1,u}(k)$, and $\hat{H}_{2,u}(k)$ of the same subcarrier. Accordingly, currently obtained $\hat{H}_u(k)$, $\hat{H}_{1,u}(k)$, and $\hat{H}_{2,u}(k)$ are subjected to IDFT so that they may be converted into $\hat{h}_u(\tau)$, $\hat{h}_{1,u}(\tau)$, and $\hat{h}_{2,u}(\tau)$, respectively, in a delay time domain. By applying IDFT to channel state information $H(k)$, impulse responses of a channel can be obtained. However, $\hat{H}_u(k)$, $\hat{H}_{1,u}(k)$, and $\hat{H}_{2,u}(k)$ have been obtained by multiplying a channel matrix $H(k)$ by a linear filter $W(k)$, and also, in OFDM signal transmission, a guard band is generally inserted into a frequency domain. Thus, $\hat{h}_u(\tau)$, $\hat{h}_{1,u}(\tau)$, and $\hat{h}_{2,u}(\tau)$ do not exactly reflect impulse responses of a channel. Power of $\hat{h}_u(\tau)$, $\hat{h}_{1,u}(\tau)$, and $\hat{h}_{2,u}(\tau)$ mostly concentrate on the guard interval time length. Thus, when a guard interval length is indicated by an $N_g$ sample, $e_1$ and $e_2$ are calculated by using equations (6).

[Math. 6]

$$e_1 = \sum_{\tau=1}^{N_g} |\hat{h}_u(\tau) - \hat{h}_{1,u}(\tau)|^2 \quad (6)$$

$$e_2 = \sum_{\tau=1}^{N_g} |\hat{h}_u(\tau) - \hat{h}_{2,u}(\tau)|^2$$

The modulo decision section 224 determines, on the basis of $e_1$ and $e_2$ calculated by using equations (6), whether modulo calculations will be performed (step S17). If $e_1$ is smaller than $e_2$ (step S17; Yes), it means that the channel estimation value $\hat{H}_{1,u}(k)$ estimated on the basis of the first provisional decision value sequence is closer to the channel estimation value $\hat{H}_u(k)$ estimated on the basis of DM-RS than $\hat{H}_{2,u}(k)$. Accordingly, the modulo decision section 224 determines that the transmission code is a first code, and outputs the first provisional decision value sequence $\{S_{1,u}(k)\}$ (step S18). Conversely, if $e_2$ is smaller than $e_1$ (step S17; No), the modulo decision section 224 determines that the transmission code is a second code, and outputs the second provisional decision value sequence $\{S_{2,u}(k)\}$ (step S19).

By performing the above-described processing, the modulo estimating unit 209 is able to estimate whether a transmission code is a first code or a second code. Alternatively, a certain threshold may be supplied to the modulo estimating unit 209, and if $e_1$ exceeds the threshold, it is determined that a transmission code is a second code. Accordingly, calculations for $e_2$ are not performed. In this case, it is not necessary to estimate the third channel state information. Conversely, a transmission code may be estimated from $e_2$ and a threshold. It is necessary that the threshold be set to be an optimum value in accordance with the state of a channel. The threshold can be found by measuring BER in advance, and may be set to be the average received SNR or the average received-signal-to-interference-plus-noise ratio (SINR) estimated by CRS.

Another method may be considered as a decision method employed in the modulo estimating unit 209. A flowchart of a series of signal processing operations performed by the modulo estimating unit according to another method is shown in FIG. 7.

As in the signal processing shown in FIG. 6, a data signal component output from the reference signal demultiplexer 205 and channel state information obtained by using DM-RS output from the channel estimating unit 206 are input into the modulo estimating unit 209. However, in the signal processing shown in FIG. 7, a threshold $\Gamma$ is also input (step S21). It is necessary that the threshold be set to be an optimum value in accordance with the state of a channel. As stated above, the threshold can be found by measuring BER in advance, and may be set to be the average received SNR or the average received SINR.

Steps S22 through S25 are the same as steps S12 through S15, respectively, shown in FIG. 6, and thus, an explanation thereof will be omitted. In this method, the modulo decision section 224 (determining means) calculates the mean square error $e_1$ between $\hat{H}_{1,u}(k)$ and $\hat{H}_{2,u}(k)$ as the mean square error (step S26). If $e_1$ is greater than the threshold $\Gamma$ (step S27; Yes), the modulo decision section 224 outputs the second provisional decision value sequence $\{S_{2,u}(k)\}$ (step S28). If $e_1$ is smaller than the threshold $\Gamma$ (step S27; No), the modulo decision section 224 outputs the first provisional decision value sequence $\{S_{1,u}(k)\}$ (step S29). This method is based on the fact that there is no great difference between $\hat{H}_{1,u}(k)$ and $\hat{H}_{2,u}(k)$ if a first code is a transmission code.

An output from the modulo estimating unit 209 is input into the P/S converter 210, and is subjected to parallel-to-serial conversion. An output from the P/S converter 210 is then input into the data demodulator 211 and the channel decoder 212 and is subjected to data demodulation and channel decoding, respectively. As stated above, it may be necessary to calculate LLR concerning input information depending on the channel decoding method. In this case, the optimum LLR calculation method may be different depending on whether a transmission code is a first code or a second code.

This will be described by way of example, assuming that the modulation method is BPSK modulation for simple representation. As the modulo width M in BPSK, 4 is the optimum value. If a transmission code is a first code, LLR is calculated as follows. The conditional probability (also called the posterior probability) of the received signal $R_u(k)$ when the transmission bit is 1, that is, $d_u(k)=1$, and the conditional probability of $R_u(k)$ when the transmission bit is 0, that is, $d_u(k)=-1$ are calculated. Then, the logarithm of the ratio of the two probabilities is calculated as LLR of the first code. On the other hand, if a transmission code is a second code, LLR is calculated as follows. As in the case of the first code, the conditional probability of the received signal $R_u(k)$ when $d_u(k)=1$ is found. In this case, however, it is necessary to find the probability by considering all perturbation terms that may be selected by the precoder 105. That is, the conditional probabilities, not only when $d_u(k)=1$, but also when $d_u(k)=1\pm4, 1\pm8, \ldots$ are found, and the value obtained by adding all the conditional probabilities is the conditional probability when the transmission bit is 1. However, it is not possible to consider all the perturbation terms, and generally, among $1, 1\pm4, 1\pm8, \ldots$, the value closest to the received signal is considered. The conditional probability when the transmission bit is 0 is found in a similar manner. Then, the logarithm of the ratio of the two probabilities is calculated as the LLR of the second code.

If the above-described LLR calculations are performed, the channel decoder 212 always requires the first provisional decision value sequence $\{S_{1,u}(k)\}$ regardless of the type of precoding method used in the precoder 105. In this case, code decision information and the first provisional decision value sequence $\{S_{1,u}(k)\}$ may be output from the modulo estimating unit 209 and may be input into the channel decoder 212, thereby enabling the channel decoder 212 to select the optimum LLR calculation method.

In the modulo estimating unit 209 of this embodiment, decision-feedback channel estimation based on soft estimation value sequences obtained by performing simple reverse modulation on a data signal is performed. Alternatively, soft estimation value sequences corresponding to $\{S_{1,u}(k)\}$ and $\{S_{2,u}(k)\}$ may be generated from an output from the channel decoder 212, and decision-feedback channel estimation may be performed on the basis of the generated soft estimation value sequences.

In this embodiment, it is assumed that OFDM signal transmission is performed and that precoding is performed for each subcarrier. However, there is no limitation on the transmission scheme (or the access scheme) or the unit by which precoding is performed. For example, this embodiment is also applicable to a case in which precoding is performed for each resource block constituted by a plurality of subcarriers. Similarly, this embodiment is also applicable to a single-carrier-based access scheme (for example, single-carrier frequency division multiple access (SC-FDMA) scheme).

In this embodiment, as precoding, precoding in MU-MIMO is performed. However, this embodiment may be applicable, not only to precoding related to MU-MIMO, but also to any type of precoding in which a perturbation vector may probably be added to a transmitting signal. For example, this embodiment is also applicable to precoding for reducing PAPR in OFDM transmission proposed by Takeda et al. That is, the transmission mode to which this embodiment is applicable is not restricted to MU-MIMO, and may be applicable to single transmission between the base station device 100 and one terminal device 200. Additionally, if the terminal device 200 includes a plurality of receive antennas, a plurality of data streams may be received simultaneously. In this case, the above-described signal processing performed by the modulo estimating unit 209 may be performed for each stream.

In the transmission-code estimation method of this embodiment, it is necessary to insert DM-RS into all OFDM signals. However, even for an OFDM signal into which DM-RS is not inserted, it is possible to perform transmission-code estimation by utilizing an adjacent OFDM signal into which DM-RS is inserted. More specifically, decision-feedback channel estimation for an OFDM signal into which DM-RS is not inserted is performed on the basis of first channel state information obtained for an adjacent OFDM signal into which DM-RS is inserted. Additionally, for an OFDM signal into which DM-RS is not inserted, signal demodulation may be performed on the basis of results obtained by estimating a transmission code for an adjacent OFDM signal into which DM-RS is inserted. Alternatively, regardless of whether or not DM-RS is inserted, transmission-code estimation is performed only for specific OFDM signals (for example, OFDM signals at the head of frames) or specific sub-bands (for example, sub-bands at the center of a signal band), and for the remaining OFDM signals or sub-bands, signal demodulation may be performed on the basis of the estimation results obtained for such specific OFDM signals or sub-bands.

In this embodiment, the estimation precision for estimating whether a transmission code is a first code or a second code is determined by the frequency with which a perturbation term is applied to a second code in one OFDM signal. The reason for this is as follows. In order to highly precisely estimate whether a transmission code is a first code or a second code, it is desirable that a perturbation term be always applied to a second code. In actual transmission, however, a determination as to whether a perturbation term will be applied to a second code is dependent on channel state information or transmission data, and thus, there may be cases in which almost no perturbation terms are applied to second codes, depending on the environments. Accordingly, in order to improve the estimation precision, in a precoder of a base station device, in addition to ideal perturbation terms calculated by, for example, channel state information, random perturbation terms may be applied, thereby contributing to an improvement in the estimation precision for estimating transmission codes in a terminal device. Alternatively, simply, only random perturbation terms may be added without adding ideal perturbation terms. In this case, it is desirable that the above-described processing be performed only for wireless resources for which transmission-code estimation is performed. If a threshold is applied to the modulo estimating unit 209 in advance, the value of the threshold may be changed in accordance with how perturbation terms are applied.

In MU-MIMO using THP, the transmission performance is significantly changed by performing ordering processing in which the order of transmission codes is appropriately set in advance. In this case, the probability that a perturbation term be applied to transmission codes which are ordered in the second half of codes is high. Accordingly, instead of utilizing an ideal order calculated on the basis of, for example, channel state information, transmission codes for terminal devices to which first codes will be transmitted may be disposed on the first half of codes, and transmission codes for terminal devices to which second codes will be transmitted may be disposed on the second half of codes, thereby improving the estimation precision for estimating transmission codes in a terminal device. It is desirable that the above-described ordering processing be performed only for OFDM signals for which transmission-code estimation will be performed or for a specific number of subcarriers.

According to the method described above, a wireless receiving apparatus is able to estimate whether a transmission code is a first code or a second code without the need for a wireless transmitting apparatus to supply control information indicating whether or not it is necessary to perform modulo calculations, that is, whether a transmission code is a first code or a second code, to the wireless receiving apparatus. Accordingly, it is possible to suppress an increase in the overhead, which would otherwise be caused by the addition of control information, thereby contributing to an improvement in the frequency efficiency.

[Others]

While the embodiment of the present invention has been described in detail with reference to the drawings, it is to be understood that specific configurations are not limited to the disclosed embodiment, and, designs, for example, within the spirit of this invention are included in the scope of the claims.

A program operated in a mobile station device and a base station device according to the present invention is a program which controls a CPU, etc. so that the functions of the above-described embodiment of the present invention can be implemented (a program which causes a computer to function). Then, information handled in these devices is temporarily stored in a RAM when being processed, and is then stored in various ROMs or an HDD. The information is read by the CPU when necessary and is updated or overwritten. As a recording medium which records the program, any type of recording medium, such as a semiconductor medium (for example, a ROM or a non-volatile memory card), an optical recording medium (for example, a DVD, an MO, an MD, a CD, or a BD), or a magnetic recording medium (for example, magnetic tape or a flexible disk) may be used. The functions of the above-described embodiment are implemented by operating the loaded program. Alternatively, the functions of the present invention may also be implemented by executing processing together with an operating system or another application program on the basis of instructions of the loaded program.

If the above-described program is put onto the market, it may be recorded on a portable recording medium and be distributed, or may be transferred to a server computer connected to the above-described devices via a network, such as the Internet. In this case, a storage device of a server computer is included in the present invention. Moreover, the entirety or part of the mobile station device and the base station device of the above-described embodiment may be typically implemented by an LSI, which is an integrated circuit. The functional blocks of the mobile station device and the base station device may be individually formed into chips or all or some of the functional blocks may be integrated into a chip. In this case, the mobile station device, the base station device, or the functions thereof do not have to be integrated into an LSI, but they may be implemented by a dedicated circuit or a general-purpose processor. Moreover, due to the progress of semiconductor technologies, if a circuit integration technology which replaces an LSI technology is developed, an integrated circuit formed by such a technology may be used.

REFERENCE SIGNS LIST 200 terminal device
201 receive antenna
202 wireless receiver
203 GI remover
204 FFT unit
205 reference signal demultiplexer
206 channel estimating unit
207 feedback information generator
208 wireless transmitter
209 modulo estimating unit
210 P/S converter
211 data demodulator
212 channel decoder
221 channel compensator 222 decision-feedback channel estimating section
223 modulo calculator
224 modulo decision section

The invention claimed is:

1. A wireless receiving apparatus which includes at least one antenna and which receives a signal subjected to precoding from a wireless transmitting apparatus, the signal subjected to precoding including a reference signal and a data signal disposed in different wireless resources, comprising:
   first channel state information obtaining means for obtaining first channel state information concerning a channel between the wireless receiving apparatus and the wireless transmitting apparatus, on the basis of the received signal and the reference signal;
   second channel state information obtaining means for obtaining second channel state information concerning a channel between the wireless receiving apparatus and the wireless transmitting apparatus, on the basis of the received signal and the first channel state information;
   determining means for determining a method for demodulating a desired signal from the signal subjected to precoding, on the basis of at least part of the first and second channel state information; and
   demodulating means for demodulating a desired signal from the signal subjected to precoding, on the basis of the determined method.

2. The wireless receiving apparatus according to claim 1, wherein as the precoding, first precoding which does not include nonlinear processing and second precoding which includes nonlinear processing are utilized selectively or together.

3. The wireless receiving apparatus according to claim 1, wherein:
   the first channel state information indicates a first channel estimation value obtained on the basis of channel estimation using the received signal and the reference signal; and
   the second channel state information indicates a channel estimation value on the basis of the first channel state information and the received signal and on the basis of a decision-feedback channel estimation technique using a provisional decision value sequence related to the data signal.

4. The wireless receiving apparatus according to claim 3, wherein the channel estimation value obtained on the basis of the decision-feedback channel estimation technique includes one or both of a second channel estimation value and a third channel estimation value, the second channel estimation value being obtained on the basis of the decision-feedback channel estimation technique which is performed assuming that the precoding is the first precoding, the third channel estimation value being obtained on the basis of the decision-feedback channel estimation technique which is performed assuming that the precoding is the second precoding.

5. The wireless receiving apparatus according to claim 4, wherein the determining means obtains one of a first mean square error between the first channel estimation value and the second channel estimation value and a second mean square error between the first channel estimation value and the third channel estimation value, and determines a method for demodulating a desired signal from the signal subjected to precoding, on the basis of a value of the obtained mean square error.

6. The wireless receiving apparatus according to claim 5, wherein:
   in a case in which the obtained mean square error is smaller than a first threshold, the determining means determines that the data signal has been subjected to the precoding related to the obtained mean square error; and
   in a case in which the obtained mean square error is greater than the first threshold, the determining means determines that the data signal has been subjected to the precoding which is not related to the obtained mean square error.

7. The wireless receiving apparatus according to claim 4, wherein:
   the determining means obtains a first mean square error between the first channel estimation value and the second channel estimation value and a second mean square error between the first channel estimation value and the third channel estimation value;
   as a result of comparing the first mean square error and the second mean square error with each other, the determining means determines that the data signal has been subjected to the precoding related to a mean square error having a smaller value; and
   the determining means determines a method for demodulating a desired signal from the signal subjected to precoding.

8. The wireless receiving apparatus according to claim 4, wherein the determining means obtains a third mean square error between the second channel estimation value and the third channel estimation value, and determines a method for demodulating a desired signal from the signal subjected to precoding, on the basis of a value of the third mean square error.

9. The wireless receiving apparatus according to claim 8, wherein:
   in a case in which the third mean square error is smaller than a first threshold, the determining means determines that the data signal has been subjected to the first precoding; and
   in a case in which the third mean square error is greater than the first threshold, the determining means determines that the data signal has been subjected to the second precoding.

10. The wireless receiving apparatus according to claim 6, wherein the first threshold is a value related to a reception quality including an average received-signal-to-noise ratio or an average received-signal-to-interference-plus-noise ratio measured by the wireless receiving apparatus.

11. A receiving method for receiving a signal subjected to precoding by using at least one antenna from a wireless transmitting apparatus, the signal subjected to precoding including a reference signal and a data signal disposed in different wireless resources, comprising:
   a step of obtaining first channel state information concerning a channel with the wireless transmitting apparatus on the basis of the received signal and the reference signal;
   a step of obtaining second channel state information concerning a channel with the wireless transmitting apparatus on the basis of the received signal and the first channel state information; and
   a step of determining a method for demodulating a desired signal from the signal subjected to precoding on the basis of at least part of the first and second channel state information.

* * * * *